United States Patent
Andersson et al.

(10) Patent No.: US 10,410,516 B1
(45) Date of Patent: Sep. 10, 2019

(54) SYSTEMS AND METHODS FOR VEHICLE GEOFENCING MANAGEMENT

(71) Applicant: Veoneer US, Inc., Southfield, MI (US)

(72) Inventors: Stefan Andersson, Alingsas (SE); Christian Svensson, Vargarda (SE); Scott A. Nist, Hartland, MI (US)

(73) Assignee: VEONEER US, INC., Southfield, MI (US)

( * ) Notice: Subject to any disclaimer, the term of this patent is extended or adjusted under 35 U.S.C. 154(b) by 0 days.

(21) Appl. No.: 15/989,069

(22) Filed: May 24, 2018

(51) Int. Cl.
| | | |
|---|---|---|
| *G08G 1/0965* | (2006.01) | |
| *H04W 4/40* | (2018.01) | |
| *G06K 9/00* | (2006.01) | |
| *G06K 9/32* | (2006.01) | |
| *G08G 1/017* | (2006.01) | |

(Continued)

(52) U.S. Cl.
CPC ........... *G08G 1/0965* (2013.01); *B60W 10/18* (2013.01); *B60W 10/20* (2013.01); *G06K 9/00825* (2013.01); *G06K 9/3258* (2013.01); *G08G 1/0141* (2013.01); *G08G 1/0175* (2013.01); *G08G 1/052* (2013.01); *G08G 1/096725* (2013.01); *H04W 4/021* (2013.01); *H04W 4/40* (2018.02); *B60W 2420/42* (2013.01); *B60W 2420/52* (2013.01); *B60W 2720/10* (2013.01); *B60W 2750/40* (2013.01)

(58) Field of Classification Search
None
See application file for complete search history.

(56) References Cited

U.S. PATENT DOCUMENTS

| | | |
|---|---|---|
| 7,096,102 B1 | 8/2006 | Parker, Sr. |
| 7,561,102 B2 | 7/2009 | Duvall |

(Continued)

FOREIGN PATENT DOCUMENTS

| | | |
|---|---|---|
| CA | 2557760 | 2/2008 |
| DE | 10033985 | 5/2001 |

(Continued)

OTHER PUBLICATIONS

International Search Report for PCT/US2019/032319, dated Jul. 1, 2019, 3 pgs.

(Continued)

*Primary Examiner* — Leon Viet Q Nguyen
(74) *Attorney, Agent, or Firm* — Matthew D. Thayne; Thayne and Davis LLC

(57) ABSTRACT

Systems and methods for allowing a remote third party to obtain data from and/or control one or more geofenced vehicles. In some implementations, a method for adjusting desired vehicle operation in a geofenced region may comprise receiving geofencing data from within a vehicle comprising a location tracking system and, upon determining that the vehicle has entered a geofenced region, transmitting a notification to an authority. Upon receiving a request from the authority, the vehicle may perform an action comprising at least one of adjusting an operational parameter of a system within the vehicle impacting movement of the vehicle, adjusting an environmental parameter of a system within the vehicle relating to sensing of the vehicle's surroundings, and transmitting vehicle environmental data to the authority comprising information regarding the vehicle's surroundings.

14 Claims, 5 Drawing Sheets

(51) Int. Cl.
*G08G 1/052* (2006.01)
*G08G 1/01* (2006.01)
*B60W 10/18* (2012.01)
*B60W 10/20* (2006.01)
*G08G 1/0967* (2006.01)
*H04W 4/021* (2018.01)

(56) References Cited

U.S. PATENT DOCUMENTS

| | | | |
|---|---|---|---|
| 7,804,424 | B2 | 9/2010 | Iwane |
| 8,930,122 | B2* | 1/2015 | Burke .................. G08G 1/22 701/117 |
| 9,598,048 | B2 | 3/2017 | Umakoshi et al. |
| 9,841,764 | B2 | 12/2017 | Kueperkoch et al. |
| 9,842,496 | B1 | 12/2017 | Hayward |
| 2007/0158125 | A1 | 7/2007 | Braeuchle et al. |
| 2007/0171077 | A1 | 7/2007 | Kawarizadeh |
| 2009/0110286 | A1 | 4/2009 | Nunn et al. |
| 2010/0094500 | A1* | 4/2010 | Jin .................... G01C 21/26 701/31.4 |
| 2013/0150004 | A1* | 6/2013 | Rosen .................. H04W 8/22 455/414.1 |
| 2016/0192172 | A1* | 6/2016 | Kim .............. G08G 1/096791 370/329 |
| 2016/0288766 | A1 | 10/2016 | Jayasuriya et al. |
| 2017/0101110 | A1* | 4/2017 | Yoo .................... B60W 10/18 |
| 2018/0052005 | A1 | 2/2018 | Schilling et al. |

FOREIGN PATENT DOCUMENTS

| | | |
|---|---|---|
| DE | 102013007141 | 12/2013 |
| EP | 1180454 | 2/2002 |
| EP | 3085583 | 10/2016 |
| WO | WO9522132 | 7/1995 |
| WO | WO9636031 | 11/1996 |
| WO | WO9949698 | 9/1999 |
| WO | WO200879902 | 3/2008 |
| WO | WO2016130765 | 8/2016 |
| WO | WO2016154936 | 10/2016 |

OTHER PUBLICATIONS

Written Opinion for PCT/US2019/032319, dated Jul. 1, 2019, 8 pgs.

* cited by examiner

SYSTEMS AND METHODS FOR VEHICLE GEOFENCING MANAGEMENT

SUMMARY

Disclosed herein are various embodiments of systems and methods for allowing a remote third party, such as an authority, to obtain data from and/or control one or more geofenced vehicles. Thus, in some embodiments, the inventive concepts disclosed herein may be used to provide information to vehicles and/or to third parties with dynamic input information that cannot be detected by typical vehicle sensors or V2X information. In some embodiments, when a vehicle enters a geofenced region, as may be defined by an authority or other third party, one or more settings and/or logic parameters may change, or communications may take place from the authority to ensure that vehicle operation matches desired traffic control, legal requirements, local events, or other temporary or permanent restrictions. In some embodiments, authorities may also be able to control vehicle operation, receive data from remote vehicles to assist in planning, searching, or other desired uses.

In a more particular example of a method for adjusting desired vehicle operation in a geofenced region, the method may comprise receiving geofencing data from within a vehicle comprising a location tracking system and, upon determining that the vehicle has entered a geofenced region, transmitting a notification to an authority. Upon receiving a request from the authority, the vehicle may perform an action comprising at least one of adjusting an operational parameter of a system within the vehicle impacting movement of the vehicle, adjusting an environmental parameter of a system within the vehicle relating to sensing of the vehicle's surroundings, and transmitting vehicle environmental data to the authority comprising information regarding the vehicle's surroundings.

In some implementations, the request may comprise a command or a request for information to identify a predetermined target, such as a target vehicle.

The action may comprise, for example, adjusting an operational parameter of a remote object detection system of the vehicle—such as a remote object detection system comprising a RADAR sensor, a visual camera, and/or a LIDAR sensor—to increase the likelihood of detecting the target vehicle or other object. In some such implementations, the action may comprise opening a hidden functional layer within the remote object detection system, such as a hidden functional layer configured to search for a predetermined license plate number of a target vehicle or a hidden functional layer configured to search for vehicles moving at a speed above a threshold speed.

In another method for providing environmental data from within a geofenced vehicle according to other implementations, the method may comprise receiving geofencing data from within a vehicle. The vehicle may comprise a location tracking system and an environmental sensor system configured to generate vehicle environmental data regarding the vehicle's surroundings. After the vehicle has entered a geofenced region, a request may be received at the vehicle from an authority. Upon receiving the request from the authority, a parameter of the environmental sensor system may be adjusted, either remotely and/or automatically by the authority or by a driver/operator of the vehicle manually. Vehicle environmental data may be transmitted to the authority. Such data may comprise information regarding the vehicle's surroundings.

In some implementations, the request may comprise a request for information to identify a predetermined target vehicle and/or person. Alternatively, the request may comprise a request for information to identify traffic in the geofenced region.

In some embodiments and implementations, the environmental sensor system may comprise a camera, and the step of transmitting vehicle environmental data to the authority may comprise transmitting data from the camera, such as photographs and/or a live stream of video from the camera.

In some implementations, the step of transmitting vehicle environmental data to the authority may comprise storing environmental data from the environmental sensor system; awaiting a trigger event; and upon detecting the trigger event, transmitting the stored environmental data to the authority. The trigger event may comprise, for example, confirming the detection of a target requested by the authority.

In some implementations, the step of adjusting a parameter of the environmental sensor system may comprise adjusting a parameter of an object classification module of the vehicle.

In an example of a method for altering vehicle operation of a geofenced vehicle, the method may comprise receiving geofencing data from within a vehicle comprising a location tracking system; and determining whether the vehicle has entered a geofenced region defined by the geofencing data, the geofence region of which may be defined by and correspond to at least one of a region of relatively high traffic density, a region associated with an accident, and a region of a temporary event. Upon determining that the vehicle has entered the geofenced region, a notification may be transmitted to an authority. A command may then be received from the authority. The vehicle, driver, and/or operator may respond to the command with an action, such as an action designed to result in alteration of desired movement of the vehicle.

In some implementations, the action may comprise adjusting an operational parameter of the vehicle impacting movement of the vehicle, such as actuating a brake of the vehicle, limiting a speed of the vehicle, adjusting steering of the vehicle, and/or disabling the vehicle from further movement.

In some implementations, the action may comprise providing an instruction or warning to an operator of the vehicle, such as actuating a light, actuating a tactile warning device, providing an audible warning sound, and/or providing a verbal instruction to the operator of the vehicle.

The vehicle may comprise an environmental sensor system configured to generate vehicle environmental data regarding the vehicle's surroundings. The method may further comprise, following the vehicle entering the geofenced region, receiving a request from the authority. Upon receiving the request from the authority, the authority, vehicle, or driver/operator may adjust a parameter of the environmental sensor system.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to obtaining information from, issuing requests to, and/or controlling remote vehicles within a geofenced region defined by an authority or other remote third party. In some embodiments, the inventive principles disclosed herein may be used to allow authorities to search for different objects, such as vehicles and individuals, control traffic, such as during particular events associated with the geofenced region, etc.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
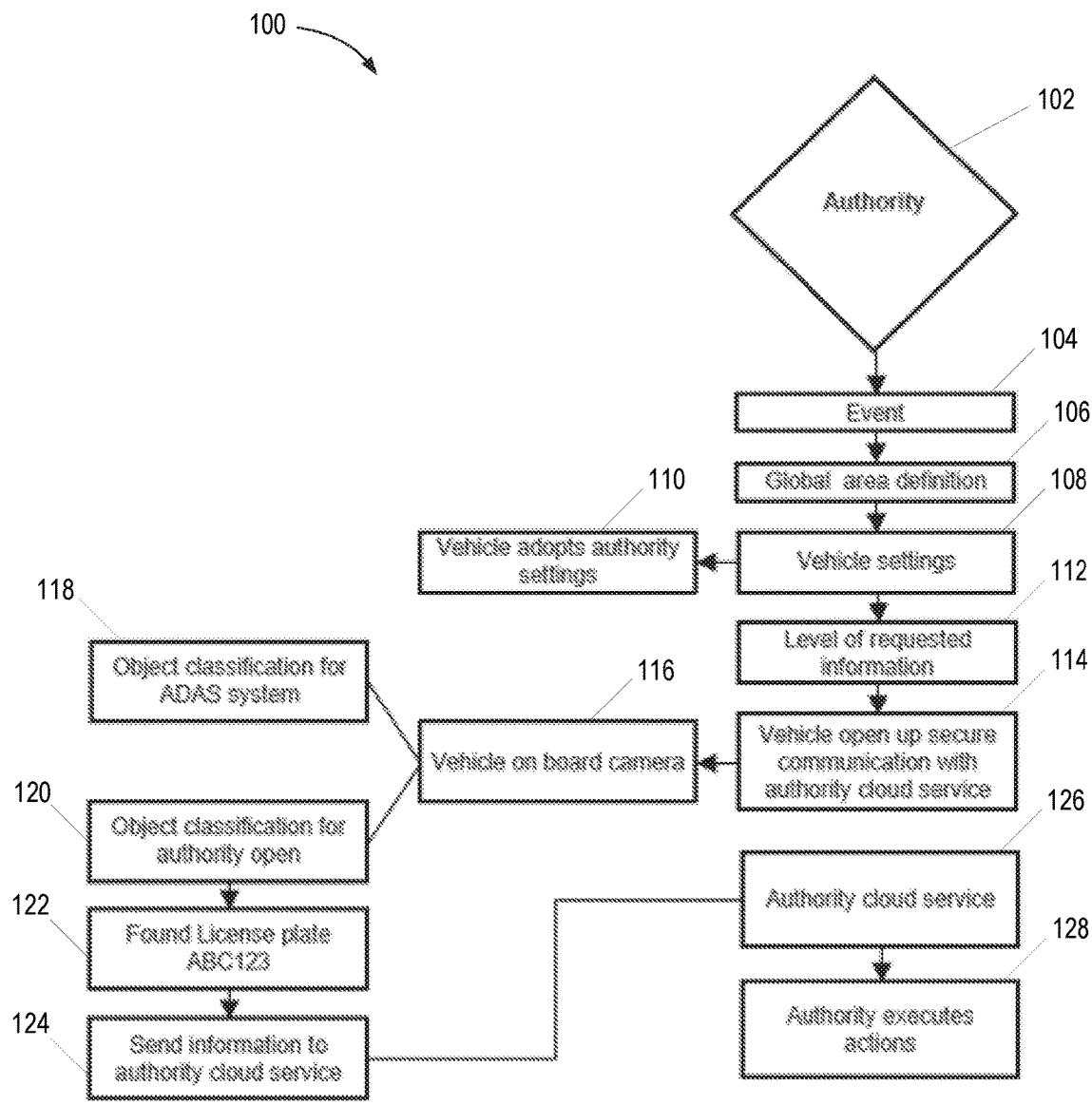
FIG. 1 illustrates an example of a system for adjusting desired vehicle operation in a geofenced region according to some embodiments.

FIG. 1 is a schematic diagram and flow chart depicting an example of a system 100 for adjusting desired vehicle operation in a geofenced region according to some embodiments, along with various steps of an inventive method according to an implementation of the invention. As shown in the figure, an authority 102, such as a police force, agency, other governmental entity or, in other embodiments and implementations, a corporate/company authority, such as an individual or division of a corporation or other company, which may, for example, be responsible for overseeing a fleet of company vehicles, may receive, generate, input, and/or transmit data relating to a particular event at 104. Example of such events may include, for example, a traffic accident, road work, an act of terrorism or terrorist threat, an indication of severe weather and/or a severe weather prediction, a criminal at large or a crime, an indication of traffic congestion, and the like.

The authority 102 may then define an area and, in some embodiments and implementations, other parameters, associated with the event 104 at 106, which area may correspond or at least relate to a geofenced region. Thus, in some embodiments and implementations, the authority 102 may define at 106 the boundaries of a region associated with the event 104, such as a region of traffic congestion, a region within which a fugitive is thought to be located, a region associated with an AMBER™ alert, etc. The geofenced region may comprise precisely defined boundaries that are unique to a particular event or, alternatively, may comprise more generally defined and/or permanent boundaries, such as all vehicles within a particular country, city, state, etc.

As discussed in greater detail below, in some embodiments and implementations, the authority 102 may, continually or periodically, maintain the location of one or more vehicles within the fleet/set, either generally or only while within the geofenced region. This information may be obtained and/or maintained by, for example, on-board geo-positioning devices and communication protocols that may either be integrated into the vehicles or may be retrofit into or otherwise used with such vehicles.

The authority 102 may also define other parameters associated with the region, such as a time window, which time window may correspond with the event 104, such as a time frame during which a vehicle and/or person that the authority 102 desires to locate is expected to be within the defined boundaries, or a time frame during which a concert or other event is expected to take place and/or result in increased traffic.

After defining the geofenced region, the authority 102 may remotely alter one or more features, parameters, functions, and/or aspects of a particular vehicle or set of vehicles at 108. For example, in some embodiments and implementations, authority 102 may issue a request and/or command, such as, in some embodiments, a command resulting in an action designed to result in alteration of desired movement of one or more vehicles. Examples of such actions include actuating a brake of the one or more vehicles, limiting a speed of the one or more vehicles, adjusting steering of the one or more vehicles, and disabling the one or more vehicles from further movement. The one or more vehicles may then adopt the settings or other commands from authority 102 at 110.

In some embodiments, a process for acceptance of the command/request may be implemented. For example, in some embodiments, a vehicle operator may choose to accept or reject the command. In some embodiments, the ability of the vehicle operator to accept or reject the command may vary depending upon the type of event and/or command. In other embodiments, a fleet of vehicles may be configured to be incapable of rejecting a command, in which case the method may comprise automatically progressing from step 108 to step 110.

To provide a more specific example, in some embodiments, authority 102 may define a geofenced area within which it is desired that vehicle speed be limited, perhaps temporarily. Following the defining of the geofenced region, a vehicle, or fleet of vehicles, preferably comprising a GPS tracker, another GPS module, or another location tracking module, such as location tracking module 520 in FIG. 5 discussed below, may be configured to transmit a notification to the authority 102 indicating that the vehicle(s) has entered the geofenced region. Then the authority 102 may transmit a signal to the one or more vehicles that results in a restriction on the vehicle(s) speed within the geofenced region and/or within a predefined time frame.

In some embodiments and implementations, either in addition to or as an alternative to altering vehicle settings impacting vehicle operation, a request may be defined and/or sent by authority 102 at 112 for a specific type of information from one or more vehicles within the geofenced region. For example, if police authorities are searching for a particular person and/or vehicle, such as a criminal or fugitive, authority 102 may transmit information about the vehicle and/or person to be identified, such as a vehicle type, make, model, vehicle features, license plate number, person description, and/or photograph of the person and/or vehicle.

Upon receiving such a request, a vehicle and/or vehicle operator may establish a communication link with the authority and/or a third party in order to attempt to obtain the requested information, or may otherwise transmit data relating to the request for information at 114. In some embodiments and implementations, the vehicle may respond to the request with an action. Such action may comprise, for example, actuating and/or adjusting an operational parameter of a remote object detection system of the vehicle, such as a RADAR sensor, a visual camera, or a LIDAR sensor.

For example, in the depicted embodiment, the vehicle's on-board camera 116 may automatically or, in other embodiments, upon confirmation by a driver/operator, an object classification system 118, such as, in some embodiments, a remote object classification system for an advanced driver-assistance system, may be altered and/or made available to authority 102 at 120. Such remote object classification systems may be used to classify remote objects into a plurality of distinct object classes or types, such as cars, bicycles, pedestrians, motorcycles, etc., from within a host vehicle using, for example, sensed data from various sensors within the vehicle.

As those of ordinary skill in the art will appreciate, such systems may comprise, for example, one or more remote detectors, such as RADAR sensors/modules, LIDAR sensors/modules, cameras, etc. Such remote detector(s) may be configured to receive sensed data from remote objects, such as other vehicles, pedestrians, bicycles, and/or stationary objects. Such systems may further comprise a controller to allow for processing of data from the remote detector(s) and/or any of the various modules of the system. As used herein, the term controller refers to a hardware device that includes a processor and preferably also includes a memory element. The memory may be configured to store one or more of the modules referred to herein and the controller and/or processor may be configured to execute the modules to perform one or more processes described herein.

As an example of a modification to an object classification system 118, in some embodiments, the communication from the authority 102 may result in a change in an operational mode of one or more sensors. Thus, for example, the communication from the authority 102 may trigger a temporary change in an operational mode of a RADAR sensor or other sensor to increase the probability of detecting a particular object. As a more specific example, again, with reference to the license plate example previously mentioned, in some embodiments a camera may be temporarily placed in a special mode or hidden functional layer within a remote object detection system of the vehicle(s) in which it attempts to read license plates from remote vehicles. Although such a mode may be too data-intensive or otherwise undesirable for standard operation, a notification from authority 102 that a particular vehicle needs to be identified may justify temporarily entering such a mode to assist one or more vehicles associated with authority 102 in locating the particular remote vehicle. In some embodiments and implementations, data from such special mode, or otherwise related to the request from authority 102, may be stored locally on the host vehicle and then subsequently transmitted to authority 102, such as following identification of the license plate, person, vehicle, or other object being searched for or following another trigger event.

As another example, in some embodiments, the vehicle(s) may respond to the request by searching for vehicles moving at a speed above a threshold speed, which may be more likely to correspond with an escaping fugitive. In some such embodiments, the hidden functional layer or special mode of a system of the vehicle(s) in the fleet/set may be used to perform this function.

As yet another example, traffic headed in a particular or range of directions within the geofenced region may be allowed to proceed unimpeded and vehicles headed in another direction or range of directions may be inhibited in some manner, such as by way of controlling such vehicles' speed, imposing braking, etc. Thus, vehicles headed away from a crash and/or traffic congestion, for example, may be able to move unimpeded and those heading toward the crash and/or traffic congestion may be subject to some form of control and/or notification by authority 102.

In some embodiments and implementations, partial or incomplete detection events may be used to trigger changes to the vehicle, vehicle settings, operational modes of various sensors, and/or changes to the geofenced region. For example, upon detecting a particular target, such as a vehicle and/or person, by one vehicle, other vehicles within the geofenced region may receive requests, setting changes, etc., that enhance the ability to track and/or re-identify the target. Similarly, detection of a target by one vehicle may trigger redefining the geofenced region, such as when a target is identified near a boundary of the region, for example. Thus, in some embodiments and implementations, a geofenced region may be redefined having a center at a location of a detection, or a partial detection, such as a possible but unconfirmed detection of a target.

In some embodiments, the request from authority 102 may comprise a request for weather information. For example, authority 102 may request or command access to vehicle cameras and/or other sensors to obtain information about weather patterns in the region of the vehicles.

If and when the request from authority 102 has been fulfilled, such as using the example of the license plate previously mentioned, when the license plate has been identified at 122, this information may be transmitted to authority 102. In some embodiments and implementations, this information may be transmitted to a cloud service 126 of or otherwise associated with authority 102. In some embodiments, data during the search may be stored locally until the license plate has been identified, another request has been fulfilled, or upon initiation of another suitable trigger.

However, in other embodiments, authority 102 may receive a stream of data or periodic updates of data related to the request, as desired. For example, in some embodiments, authority 102 may take control of a camera or other sensor(s) aboard the vehicle(s) and/or receive a stream and/or continual updates of video and/or photograph data from such camera or other sensor(s) while the request is being carried out.

Other examples of data that may be sent to authority 102 at 124 include data associated with a current location, heading, and/or speed of a remote vehicle or person that has been identified by the host vehicle. For example, if a search has been conducted for a particular vehicle and the search has resulted in identification of such vehicle, authorities may be provided with information from sensors of the host vehicle of the remote vehicle that is the subject of the search that may allow authority 102 to track the vehicle, or at least be apprised of the current location or approximate current location of the vehicle, direction in which the vehicle is currently headed, speed of the vehicle, and the like.

In some embodiments and implementations, authority 102 may then execute one or more additional actions related to the data received from the vehicle(s) at 128. For example, in some embodiments, authority 102 may narrow the defined geofence region to account for locating the vehicle in the region of the identified vehicle such that other vehicles in the fleet/set may continue to track the vehicle based upon, for example, the license plate and/or other vehicle characteristics. As another example, if the authority 102 is not a police authority, authority 102 may notify a police authority or other governmental agency/authority upon identification of the license plate/vehicle. As yet another example, authority 102 may change the geofencing settings based upon the data received, such as redefining the boundaries of the geofenced area to allow for tracking of a remote vehicle that was identified, extending the time frame of the geofencing, or changing the settings and/or operation of the vehicle(s) in the fleet/set, such as resuming normal operation of such vehicle(s).

Figure 2:
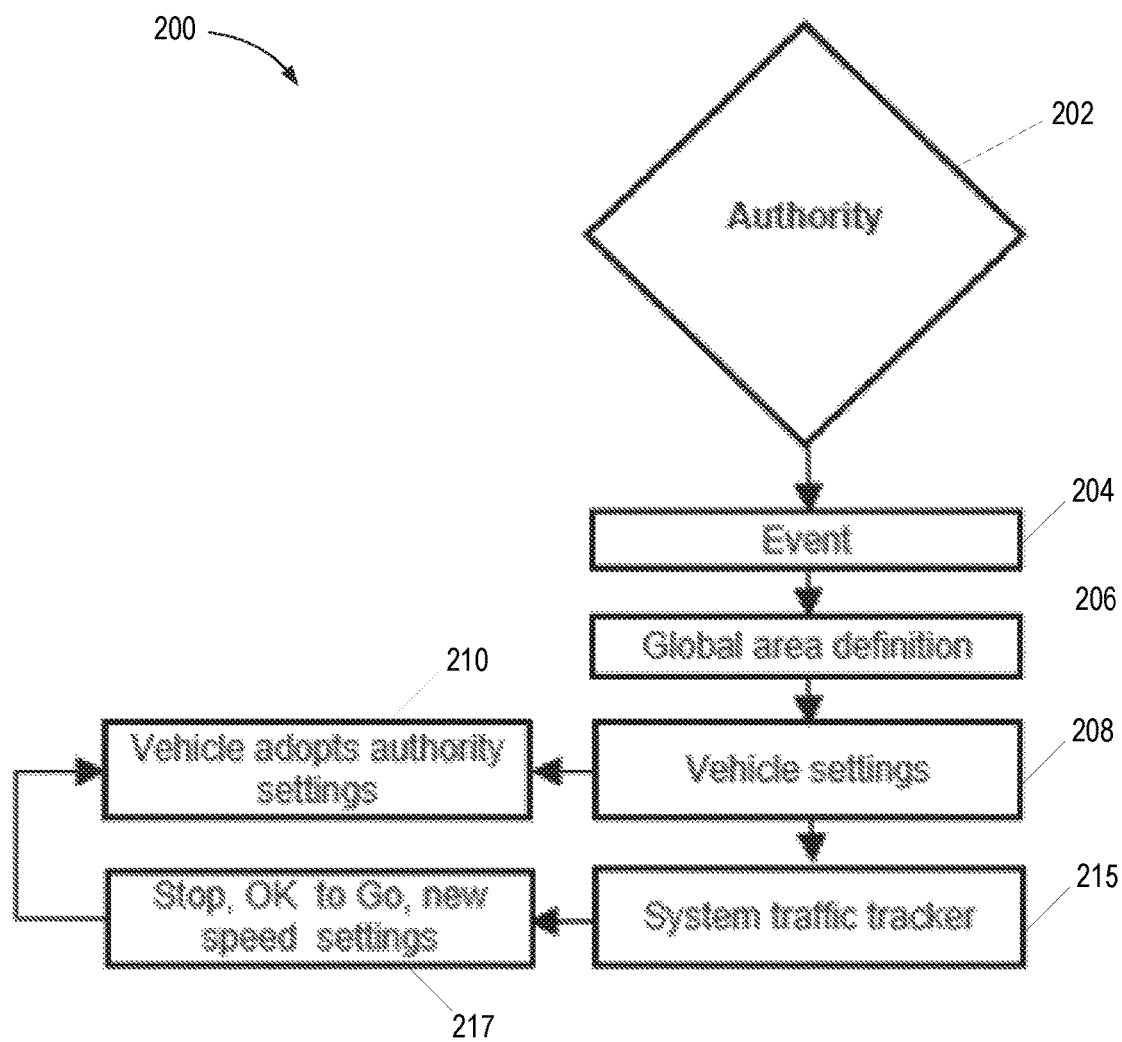
FIG. 2 illustrates another example of a system for adjusting desired vehicle operation in a geofenced region according to other embodiments.

FIG. 2 is another schematic diagram and flow chart depicting another example of a system 200 for adjusting desired vehicle operation in a geofenced region according to some embodiments, along with various steps of an inventive method according to an implementation of the invention. As shown in the figure, and as previously described, an authority 202 may receive, generate, input, and/or transmit data relating to a particular event at 204.

The authority 202 may then define an area and, in some embodiments and implementations, other parameters, associated with the event 204 at 206, which area may correspond or at least relate to a geofenced region. Thus, in some embodiments and implementations, the authority 202 may define at 206 the boundaries of a region associated with the event 204, such as a region of traffic congestion, a region within which a fugitive is thought to be located, a region associated with an AMBER™ alert, etc.

As previously mentioned, in some embodiments, the authority 202 may also define other parameters associated with the region, such as a time window associated with the event 204.

After defining the geofenced region, the authority 202 may remotely alter one or more features, parameters, functions, and/or aspects of a particular vehicle or set of vehicles at 208, which may include issuing a request and/or command, such as, in some embodiments, a command resulting in an action designed to result in alteration of desired movement of one or more vehicles. The one or more vehicles in the fleet/set may then adopt the settings or other commands from authority 202 at 210. Again, such settings may be automatically changed in some embodiments and may be changed only upon confirmation by another party, such as the driver/operator in other embodiments.

To provide another more specific example, in some embodiments, authority 202 may define a geofenced area corresponding with an accident, vehicle failure, and/or high traffic congestion. In some embodiments, the parameters of the geofenced area may include a time frame. Following the defining of the geofenced region, a vehicle, or fleet of vehicles, preferably comprising a GPS tracker, another GPS module, or another location tracking module, such as location tracking module 520 in FIG. 5 discussed below, may be configured to transmit a notification to the authority 202 indicating that the vehicle(s) has entered the geofenced region. Then the authority 202 may transmit a signal to the one or more vehicles that results in a restriction on the vehicle(s) speed within the geofenced region and/or within a predefined time frame. For example, when an accident has taken place, authority 202 may impose restrictions on vehicles' speed and/or operate the vehicle's brakes to ensure that vehicles either slow down or stop within the geofenced region. As another example, certain areas, such as parking lots, sidewalks, and other regions that may be temporarily or permanently geofenced may have speed limits imposed on vehicles within such regions.

In the embodiment of FIG. 2, a system traffic tracker 215 may be involved in system 200. System traffic tracker 215 may be used to send various signals, commands, requests, and the like to one or more vehicles in a set or fleet of vehicles, as previously mentioned. System traffic tracker 215 may be a system in control of authority 202 or, alternatively, may be a traffic control system operated by, for example, another authority or other entity, such as a local governmental agency, used to overlook and control traffic in a given region, and may include a plurality of stationary cameras or other sensors placed at various points along a roadway. Thus, authority 202 may either be in direct control of system traffic tracker 215 or may be configured to communicate with system traffic tracker 215.

In some embodiments, vehicle operational settings 208 may be controlled or altered at 208/210 and system traffic tracker 215 may be used to provide additional information, requests, and/or commands to the vehicles in the fleet/set. For example, information gathered from system traffic tracker 215 may be sent to one or more vehicles in the fleet/set at 217. For example, in a situation in which there is high traffic density and/or an accident, various individual vehicles may be provided with instructions, requests, and/or information to assist in controlling traffic. In some embodiments, individual vehicles within the fleet/set may be provided with different instructions depending upon their particular locations or other parameters unique to each vehicle.

Using the example of a geofenced parking lot, sidewalk, or other such region, in some embodiments and implementations, authority 202 may be configured to issue automated or live communication with vehicles within such regions. For example, a geofenced vehicle near an event with lots of people may receive a communication from authority 202 that attempts to determine why the vehicle is in this region, which may be prohibited for vehicles, why the vehicle is traveling beyond a restricted speed, etc. In some embodiments, authority 102 may be able to impose speed restrictions and/or disable the vehicle as needed. Again, these instructions/requests/information may be adopted by the vehicle at 210, either automatically or upon confirmation/acceptance by the operator/driver.

Figure 3:
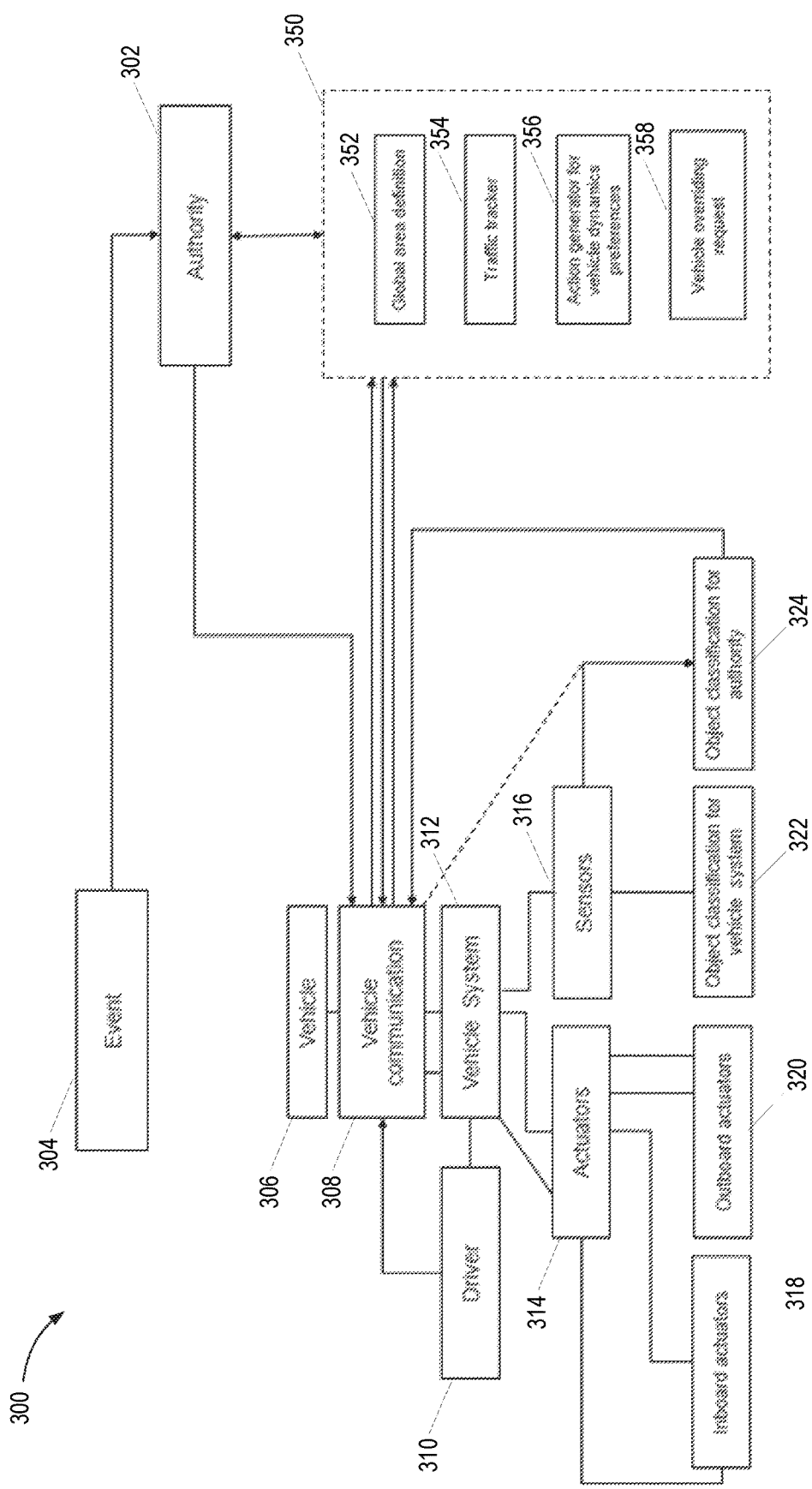
FIG. 3 illustrates yet another example of a system for adjusting desired vehicle operation in a geofenced region according to additional embodiments.

FIG. 3 illustrates another example of a system 300 for adjusting desired vehicle operation in a geofenced region according to other embodiments. System 300 again comprises an authority 302 that may be in charge, either wholly or partially, of controlling one or more vehicles 306. As previously mentioned, an event 304 may, in some embodiments, be used to trigger changes in requests, instructions, commands, etc. from authority 302.

Each of vehicles 306 may comprise various systems to facilitate gathering of information about its surroundings, to allow for communication with authority 302 and/or other third parties, to allow for receipt of commands from authority 302, and/or to allow for authority 302 to control various aspects of vehicle operation. For example, vehicle 306 may comprise a vehicle communication module 308, which may be configured to send and/or receive data using any available and suitable communication protocol (preferably wireless protocol), such as radio, cellular, satellite communication links, Bluetooth®, WiFi, ultra-wide band ("UWB"), Zigbee®, and or any other suitable communication protocol(s).

Each of vehicles 306 may further comprise other systems, such as a primary vehicle system 312 or backbone. System 312 may comprise, for example, an Advanced Driver-Assistance System ("ADAS"), a user interface to allow for an operator and/or driver 310 to interact with system 312, and the like. The user interface may comprise various elements such as screens, touch-screens, speakers, keypads, microphones, buttons, switches, dials, and the like.

Various other elements may be communicatively coupled with vehicle system 312, one or more of which may also be communicatively coupled with communication module 308 to allow for interaction with authority 302 and/or other entities. For example, each of vehicles 306 may comprise various actuators 314 and/or sensors 316. Actuators 314 may comprise inboard actuators 318, which may allow for receipt of various forms of communication from authority 302 and/or other entities, such as displays, lights, speakers, haptic actuators, and the like. One or more of inboard actuators 318 may be shared with vehicle system 312 and be used for other, more general functions within vehicle 306, or may be dedicated for use in connection with communication with authority 302.

Each vehicle 306 may further comprise one or more outboard actuators 320, which may be used to allow authority 302 and/or other entities to control vehicle 306. Examples of such actuators 320 include braking actuation modules, governors or other speed limiters, remote steering modules, and the like. In some embodiments, authority 302 may be able to remotely actuate and/or operate one or more of outboard actuators 320 via vehicle communication module 308. For example, as previously mentioned, in some embodiments, a geofenced region may be established due to a traffic accident or other event 304 by authority 302, after which authority 302 may control the speed of vehicle 306 through vehicle communication module 308, either by commend or by request that may be accepted or, in some embodiments, rejected by driver 310, by remotely-operating a governor among actuators 320.

In some embodiments, driver 310 may override a request or command, or attempt to override a request or command, via vehicle communication module 308. Thus, for example, a driver 310 may override or request to override a command or other geofence restriction removed due to a number of factors, such as during an emergency, when driver 310 is a repair vehicle, tow vehicle, construction vehicle, etc., that may require or desire access to a restricted area. Certain vehicles may therefore be preconfigured with certain types of permissions to allow for overriding certain requests. Alternatively, a request to override a restriction may be communicated from driver 310 to authority 302. The override request may be granted, either selectively or automatically, and either in full or in part. For example, authority 302 may remove certain restrictions, such as location restrictions, but leave other restrictions, like maximum speed and/or the ability to remotely operate one or more aspects of vehicle 306 while within the geofenced region.

Vehicle 306 may further comprise one or more sensors 316, such as RADAR sensors, visual cameras, LIDAR sensors, GPS sensors, and the like. Sensors 316 may be used to gather data in response to a request and/or command from authority 302 and/or to provide authority 302 with an indication during which vehicle 306 has entered a geofenced region defined by authority 302. For example, in some embodiments and implementations, data from a GPS module and/or sensor 316 may be used to determine when vehicle 306 is within a geofenced region defined by authority 302. This data may either be continually transmitted to authority 302 after vehicle 306 has entered the geofenced region or vehicle 306 may be configured to notify authority 302 upon predetermined trigger events, such as exiting the geofenced region, providing a response to a request from the authority 302, or the like.

Vehicle 306 may comprise various other elements, such as object classification systems 322 and 324. Object classification system 322 may comprise one or more software modules or components for classifying remotely-detected objects into a plurality of distinct object types or classes, such as cars, bicycles, pedestrians, motorcycles, etc., from within vehicle 306 using, for example, sensed data from sensors 316.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

In some embodiments, one object classification module or system may be provided for internal use by vehicle 306 and another may be controlled by and/or used to provide data to authority 302. For example, in the depicted embodiment, object classification system 322 may be used internally by vehicle 306 for typical purposes involved in vehicle operation, as those of ordinary skill in the art will appreciate. Object classification system 324 may be exclusively, or partially, used to gather data used in responding to a command or request by authority 302. However, in alternative embodiments, a single object classification system may be used for internal vehicle uses and for use by authority 302. In some such embodiments, the object classification system may be configured to operate in distinct modes depending upon whether authority 302 is involved in the particular function at issue at a given time.

For example, in some embodiments, system 324 may comprise an embedded and/or hidden mode and/or functional layer within object classification system 322, which may change software reaction behavior, response times, thresholds, and the like. Thus, in some embodiments and implementations, upon receipt of a request or command from authority 302, or a request or command from authority 302 of a particular type, object classification system 322 may be configured to open an operational layer comprising object classification system or module 324. This layer or mode may provide for functionality unavailable to driver 310 during normal operation.

For example, in some embodiments, object classification module 324 may be configured to cede control of one or more cameras or other sensors 316 to authority 302 for a limited time period. As another example, object classification system/module 324 may be configured to obtain data of a different type than system 322, such as attempting to recognize license plate data from remote vehicles, for reasons previously discussed. Similarly, object classification system/module 324 may be configured to temporarily attempt to recognize other non-standard data and/or objects, such as road sign shapes and/or text, human faces, weather patterns, etc.

In other embodiments, object classification system/module 324 may be configured to temporarily increase or decrease certain thresholds associated with detection of remote objects, such as a detection threshold and/or a tracker threshold. Thus, for example, the special operational mode may lower detection thresholds and/or require fewer consistent detections to maintain a track. This may provide for increasing the probability of detection of a particular object, as may be identified by authority 302, such as a vehicle or person.

As yet another example, in some embodiments, one or more elements of object classification system/module 324 may be configured with hidden algorithms or other hidden or non-standard operational modes that are preconfigured or tuned to identify certain specific items and/or aspects of items, such as particular colors, shapes, characters, or other attributes. For example, when an authority sends a request to identify a particular car, truck, motorcycle, license plate, partial license plate, person or a distinguishing characteristic of any of the foregoing, vehicles in a set/fleet may be configured to alter object classification system/module 324 in a way to bias detection of such items and/or particular items having such characteristics. Although it is contemplated that such modes/functionality may be part of the standard operation of object classification system/module 324, in preferred embodiments and implementations, these modes/functionality may instead only be opened and/or accessed by command and/or trigger, which, as mentioned above, may be from an authority, a user/driver, or may automatically trigger based upon a particular event, such as a partial or probable detection event. In this manner, the hidden modes/functionality/algorithms may be configured to avoid bogging down the system until/unless they are needed.

As also illustrated in FIG. 3, system 300 may further comprise a vehicle coordination and/or communication system 350, which may comprise, for example, a cloud-based storage and/or communication system or service. System 350 may comprise a global area definition or GPS tracking system 352, which may comprise various communication modules, monitors, processors, servers, and/or GPS receivers. System 352 may be configured to collect tracking information, in some embodiments in in real-time, for one or more vehicles and may store such data in a database, preferably with capability to respond to searches for historical tracking data.

System 350 may further comprise and/or be configured to communicate with a traffic tracker system 354. As previously mentioned, traffic tracker system 354 may be a system in control of authority 302 or, alternatively, may be a traffic control system operated by, for example, another authority or other entity, such as a local governmental agency, used to overlook and control traffic in a given region, and may include a plurality of stationary cameras or other sensors placed at various points within a geofenced region.

System 350 may further comprise a vehicle dynamics/preferences action module or system 356. System 356 may be configured to detect one or more particular vehicle parameters, specifications, and/or current vehicle characteristics to allow for controlling actuators 314 and/or sensors 316. For example, in some embodiments, system 356 may be configured to receive input from authority 302 in terms of a desired outcome—e.g., STOP VEHICLE X—and calculate desired actuation parameters for achieving such outcome. Thus, if authority 302 issues a command to stop VEHICLE X, system 356 may be configured to receive input from a vehicle communication system of VEHICLE X, such as vehicle communication module 308, with regard to the specifications and/or parameters of the actuators of VEHICLE X in order to ensure that the vehicle is safely brought to a stop. The direction, location, and speed of VEHICLE X may similarly be used in this analysis, which data may be obtained from one or more of onboard sensors 316.

Some embodiments may further comprise a vehicle override module 358, which may be configured to determine whether vehicle 306 is allowed to override a particular request rather than have it be treated as a command. For example, a vehicle may be allowed to override a request to limit vehicle speed if event 304 is flagged as a non-critical event or otherwise less than a threshold for importance.

Some embodiments may also, or alternatively, be configured to process all or, in some such embodiments, some, requests from the authority onboard and then transmit data responsive to the requests upon detecting certain trigger events. This may be beneficial to save on bandwidth for both processing by, and data transfer to, the authority and/or a related server and/or cloud service. For example, upon receiving a request to identify a particular vehicle, a special operational layer may be opened in which thresholds of one or more sensors are altered, software modules are otherwise modified, and/or hardware is actuated. However, preferably, the processing for such enhanced searching is performed on the host vehicle and data from the search is not transmitted to the authority until the detection of a trigger event, such as detection or probable detection of the vehicle or other objects for which the search request was issued. At such time, certain data, the level or which may be requested by the authority, may be transmitted to the authority. Of course, in certain circumstances the authority may take control over various actuators and/or sensors of the vehicle as needed, which may result in immediate transmission of data and/or processing of such data by the authority, as needed.

Figure 4:
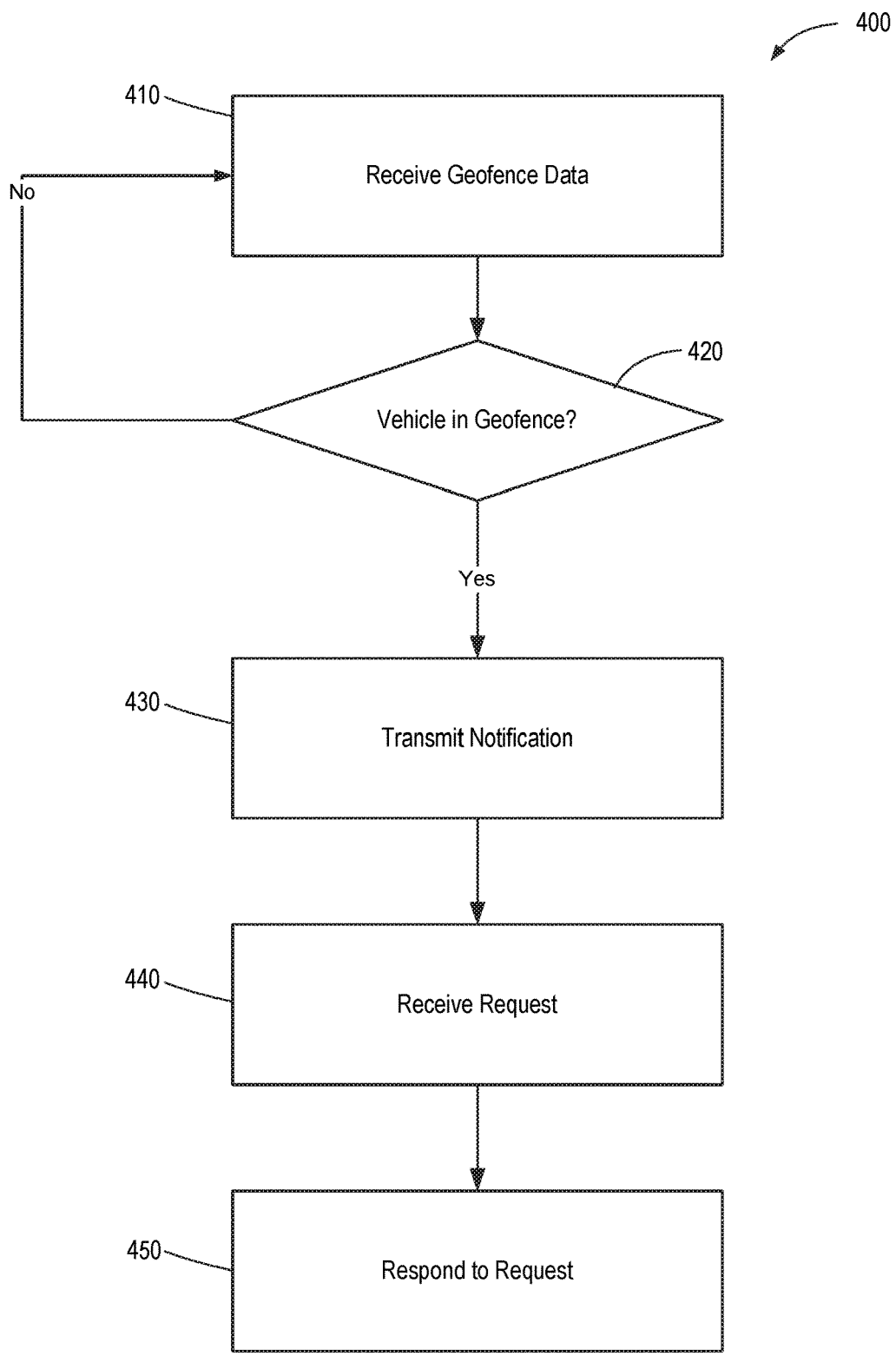
FIG. 4 is a flowchart illustrating a method for adjusting desired vehicle operation in a geofenced region according to some implementations.

FIG. 4 is a flowchart illustrating a more generalized implementation of a method 400 for adjusting desired vehicle operation in a geofenced region. Method 400 comprises receiving geofence data at 410, which may be received by a vehicle in a fleet or set of one or more vehicles from an authority or other entity. As previously mentioned, the geographic parameters and/or timing of the geofence may be established by the authority and may make up the geofence data received by the vehicle.

A determination may be made at 420 as to whether the vehicle is within the geofenced region defined by the authority. This determination may be made repeatedly and/or in an iterative and/or looping manner as needed so that an accurate representation of the vehicle's location may be made and, as needed, provided to the authority. Thus, if the vehicle is determined to be outside of the geofence parameters, meaning outside of the geographic boundaries and/or outside of the temporal boundaries, method 400 may revert to 410 and either receive additional geofencing data from the authority or continue to query on a basis as needed as to whether the vehicle is within the geofence boundaries.

Once it has been determined that the vehicle is within the geofence boundaries, a notification may be transmitted at 430. Such notification may be transmitted directly to the authority establishing the geofence boundaries or to a third party, such as a cloud service associated with the authority, another entity as may be selected by the authority, or to any other third party as desired according to an event that may be used as a trigger to establish and/or define the boundaries of the geofencing.

In some implementations, the notification may be transmitted immediately upon determining that the vehicle is within the geofence boundaries. Alternatively, the notification may be transmitted at a later time, such as upon a secondary trigger event. For example, in some embodiments and implementations, the one or more vehicles may be configured to automatically adopt certain commands upon entering the geofencing area, which may not require immediate notification of the authority. Such notification may take place later, such as upon determining that a particular vehicle has satisfied a request associated with the geofence, or, in other implementations, not at all.

However, in the depicted implementation, a request is received, in some implementations from the authority, at 440. In some implementations, the request may relate to a particular event that may have resulted in generation of geofencing parameters associated with the geofence data referenced in step 410. In some implementations, the request may comprise a command in which the vehicle/driver/operator is not able to accept or reject the request. The request may comprise, for example, a request for information to identify a predetermined target, such as a target vehicle or target individual. The request may comprise a command, such as a command that prohibits a vehicle from travelling in a certain direction and/or above a threshold speed, such as travelling down a one-way street in the wrong direction or travelling beyond a certain speed or in certain regions near a school or event.

The vehicle/driver/operator may then respond to the request at 450. In some implementations, step 450 may automatically follow from step 440 such that, for example, one or more actions are taken place immediately and without discretion from the vehicle/driver/operator upon receipt of the request/command. In other implementations, the vehicle/driver/operator may be able to reject the request, or to select one or more options related to responding to the request.

When the response to the request comprises an action, the action may comprise, for example, adjusting an operational parameter of a remote object detection system of the vehicle to increase the likelihood of detecting something, such as a target vehicle or target individual. In some such implementations, the action may comprise opening a hidden functional mode or layer of the remote object detection system, such as a camera or RADAR sensor of the remote object detection system, to, for example, increase the likelihood of detecting a particular object related to the request.

In some implementations, the vehicle/driver/operator may receive an instruction or warning, which may be provided by one or more of actuating a light, actuating a tactile warning device, providing an audible warning sound, and providing a verbal instruction to the operator of the vehicle. For example, individual vehicles in a set or fleet may be provided with instructions and/or warnings associated with objects and/or events in their path, such as an upcoming accident, weather pattern, or restricted region for vehicles and/or vehicle speed.

Figure 5:
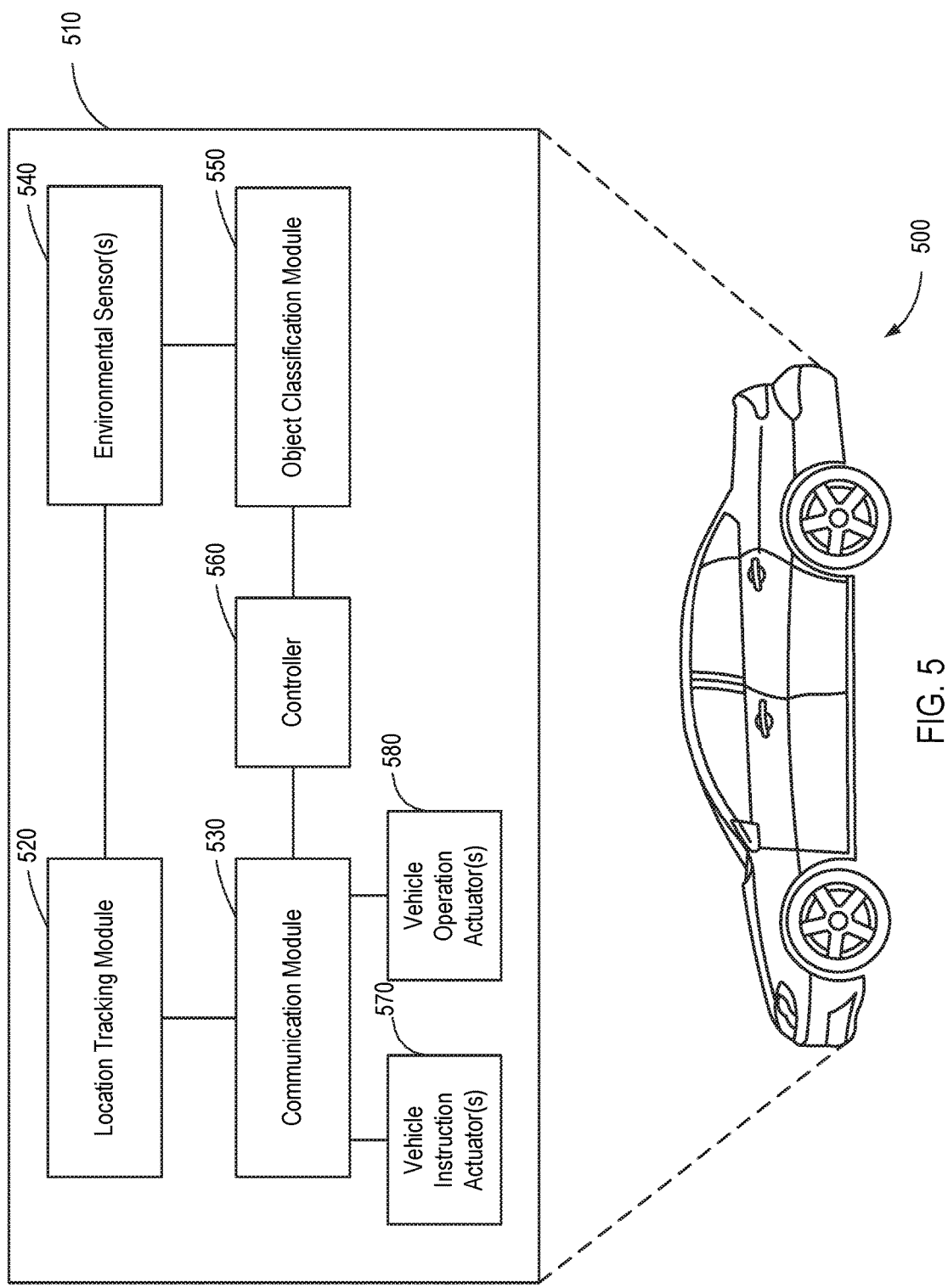
FIG. 5 is a schematic diagram of a vehicle comprising a system for allowing an authority, to provide requests, commands, instructions, and/or remote operation of the vehicle.

FIG. 5 illustrates a vehicle 500 comprising a system 510 for allowing a third party, such as an authority, to provide requests, commands, instructions, and the like, including remote operation of vehicle 500 in some embodiments, to the vehicle 500 within a geofenced region that may be defined by the authority/third party according to some embodiments. As shown in this figure, system 510 may comprise a location tracking module 520, which may comprise, for example, a GPS transceiver configured to communicate with and receive location information from a satellite navigation system.

System 510 may further comprise a communication module 530, which may comprise various components and features to allow vehicle 500 to communicate with and, more particularly, receive requests, commands, instructions and the like from a third party, such as an authority and/or other vehicles in a fleet/set. Communications module 530 may therefore comprise, for example, any of various wireless communication means, such as wireless carrier systems, a personal communications system ("PCS"), a global system for mobile communication, and/or any other suitable communication system incorporating any suitable communication standards and/or protocols. In some embodiments, communications module 530 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, communications module 530 may incorporate one or more satellite communication links (not shown).

Communications module 530 may be configured to provide various types of data to an authority or other third party, including location/tracking data, data regarding objects detected by various sensors and/or detection modules in the vehicle, feedback data to facilitate remote operation of the vehicle, and the like. In addition, in some embodiments and implementations, data generated by the vehicle, which may be communicated to the authority or other third party via communications module 530, may comprise metadata, which metadata may comprise, for example, data representative of or otherwise relating to the quality of a particular detection, the confidence level of the detection, relative location, time/date, etc. Various other systems/elements, such as a memory module, may continue to add to or supplement such metadata at the time of or following a detection event, such as geo location, time, validation, encryption, etc.

System 510 may further comprise one or more environmental sensors 540, such as RADAR sensors/modules, LIDAR sensors/modules, cameras, etc. Such sensors and/or detector(s) 540 may be configured to receive sensed data from remote objects, such as other vehicles, pedestrians, bicycles, and/or stationary objects to provide data responsive to requests from an authority or other third party.

Following the sensor output and, in some embodiments and implementations, the metadata build, the data may be stored locally, such as in a data module or memory component. In some embodiments and implementations, this data may then queued for priority transmission to the authority or other third party upon request or following another suitable trigger event.

In some embodiments and implementations, various other trigger events may be used to initiate the transmission, cancel the priority queue, end a priority detection mode, layer, and/or algorithm, and/or delete some or all of this data. Such trigger events include, for example, time limit expirations, exiting a geofenced region, a safety trigger event, such as encountering dangerous weather and/or road conditions, or a notification from an authority or other third party.

An object classification module 550 may be provided and may be configured to use data from the various sensors 540 and/or other modules to classify remote objects into one of a plurality of distinct object classes or types. In some embodiments, object classification module 550 may be configured to apply a statistical analysis of such data in performing this classification. In addition, as previously mentioned, in some embodiments, module 550 may comprise one or more functional layers, modes, and/or features that may be opened by the authority and/or may be utilized by vehicle 500 responsive to a request from such an authority.

For example, in some embodiments, a functional layer providing for optical recognition of text, such as from license plates of remote vehicles, may be opened upon receiving a request from an authority to locate a particular vehicle having a particular license plate number. As another example, responsive to a request from an authority, system 510 may be configured to open a functional layer that detects speeds of vehicles near the host vehicle. In some such embodiments, the functional layer may seek to detect other vehicles that are moving at beyond a threshold speed to, for example, search for escaping fugitives or criminals.

A controller 560 may be provided in order to allow for processing of data from environmental sensor(s) 540 and/or any of the various modules of system 510. As used herein, the term controller refers to a hardware device that includes a processor and preferably also includes a memory element. The memory may be configured to store one or more of the modules referred to herein and the controller 540 and/or processor may be configured to execute the modules to perform one or more processes described herein.

Various other modules may be provided to facilitate providing instructions from an authority and/or allowing the authority to modify various aspects of the vehicle relating to its movement and/or its ability to gather data related to a request from the authority. For example, system 510 may comprise one or more vehicle instruction actuators 570, which may be used to communicate instructions, warning, requests, etc. Thus, in some embodiments, vehicle instruction actuator(s) 570 may comprise speakers, lights, screens or other visual displays, haptic actuators, and the like, which may be configured for being controlled, operated, or at least otherwise communicatively coupled with an authority to communicate such instructions, warnings, requests, or the like.

One or more vehicle operation actuators 580 may also be provided, which may be configured to allow an authority or other remote third party to control various aspects of vehicle operation impacting movement of the vehicle 500. For example, vehicle operation actuator(s) 580 may comprise braking actuation modules, governors or other speed limiters, remote steering modules, and the like. In some embodiments, the authority may be able to remotely actuate and/or operate one or more of vehicle operation actuators 580 via communication module 530.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for adjusting desired vehicle operation in a geofenced region, the method comprising the steps of:
   receiving geofencing data from within a vehicle comprising a location tracking system;
   determining whether the vehicle has entered a geofenced region defined by the geofencing data;

upon determining that the vehicle has entered the geofenced region, transmitting a notification to an authority;

receiving a request from the authority, the request comprising a request for information to identify a predetermined target; and responding to the request with an action comprising at least one of adjusting an operational parameter of a system within the vehicle impacting movement of the vehicle, adjusting an environmental parameter of a system within the vehicle relating to sensing of the vehicle's surroundings, and transmitting vehicle environmental data to the authority comprising information regarding the vehicle's surroundings to provide information to the authority usable to increase a likelihood of identifying the predetermined target.

2. The method of claim 1, wherein the request further comprises a command.

3. The method of claim 1, wherein the predetermined target comprises a target vehicle.

4. The method of claim 3, wherein the action comprises adjusting an operational parameter of a remote object detection system of the vehicle to increase the likelihood of detecting the target vehicle.

5. The method of claim 4, wherein the remote object detection system comprises at least one of a RADAR sensor, a visual camera, and a LIDAR sensor.

6. The method of claim 4, wherein the action comprises opening a hidden functional layer within the remote object detection system.

7. The method of claim 6, wherein the hidden functional layer is configured to search for a predetermined license plate number of the target vehicle.

8. The method of claim 6, wherein the hidden functional layer is configured to search for vehicles moving at a speed above a threshold speed.

9. A method for providing environmental data from within a geofenced vehicle, the method comprising the steps of:

receiving geofencing data from within a vehicle, wherein the vehicle comprises:
- a location tracking system; and
- an environmental sensor system configured to generate vehicle environmental data regarding the vehicle's surroundings;

following the vehicle entering a geofenced region, receiving a request from an authority for information to identify a predetermined target vehicle;

upon receiving the request from the authority, adjusting a parameter of the environmental sensor system to increase a likelihood of identifying the predetermined target vehicle; and transmitting vehicle environmental data to the authority comprising information regarding the vehicle's surroundings.

10. The method of claim 9, wherein the request further comprises a request for information to identify traffic in the geofenced region.

11. The method of claim 9, wherein the environmental sensor system comprises a camera, and wherein the step of transmitting vehicle environmental data to the authority comprises transmitting a live stream of video from the camera.

12. The method of claim 9, wherein the step of transmitting vehicle environmental data to the authority comprises:
- storing environmental data from the environmental sensor system;
- awaiting a trigger event; and
- upon detecting the trigger event, transmitting the stored environmental data to the authority.

13. The method of claim 12, wherein the trigger event comprises confirming the detection of a target requested by the authority.

14. The method of claim 9, wherein the step of adjusting a parameter of the environmental sensor system comprises adjusting a parameter of an object classification module of the vehicle.

* * * * *